No. 727,816. PATENTED MAY 12, 1903.
H. LYON.
SCREEN OR GRATING FOR HALF TONE PHOTOMECHANICAL
ENGRAVING PROCESSES.
APPLICATION FILED MAY 7, 1901.
NO MODEL. 3 SHEETS—SHEET 1.

WITNESSES. INVENTOR.

No. 727,816. PATENTED MAY 12, 1903.
H. LYON.
SCREEN OR GRATING FOR HALF TONE PHOTOMECHANICAL ENGRAVING PROCESSES.
APPLICATION FILED MAY 7, 1901.
NO MODEL. 3 SHEETS—SHEET 2.

WITNESSES.
Joseph Bates.
C. W. Alexander.

INVENTOR.
Henry Lyon
by J. Howard O'Brien
atty.

No. 727,816. PATENTED MAY 12, 1903.
H. LYON.
SCREEN OR GRATING FOR HALF TONE PHOTOMECHANICAL ENGRAVING PROCESSES.
APPLICATION FILED MAY 7, 1901.
NO MODEL. 3 SHEETS—SHEET 3.

WITNESSES.
Joseph Bates.
C. W. Alexander.

INVENTOR
Henry Lyon
by L. A. Ouseaw O'Brien
atty.

No. 727,816. Patented May 12, 1903.

UNITED STATES PATENT OFFICE.

HENRY LYON, OF MANCHESTER, ENGLAND.

SCREEN OR GRATING FOR HALF-TONE PHOTOMECHANICAL ENGRAVING PROCESSES.

SPECIFICATION forming part of Letters Patent No. 727,816, dated May 12, 1903.

Application filed May 7, 1901. Serial No. 59,175. (No model.)

*To all whom it may concern:*

Be it known that I, HENRY LYON, a British subject, and a resident of Manchester, in the county of Lancaster, England, have invented certain useful and new Improvements in Screens or Gratings for the Half-Tone Photomechanical Engraving Process, of which the following is a specification.

This invention relates to screens or gratings for the half-tone photomechanical engraving process in which any consecutive run or line of dots or spaces in a straight line is avoided. Hitherto such screens or gratings were chiefly produced by straight lines ruled parallel to and at right angles to one another.

My invention consists, essentially, of a screen or grating formed or produced with the spaces, dots, or openings placed in groups or clusters of two or more concentric circles around a central dot, so placed that there is not a straight or unbroken line or run of the dots or spaces in any direction across the screen.

The invention will be fully described with reference to the accompanying drawings.

Figure 1:
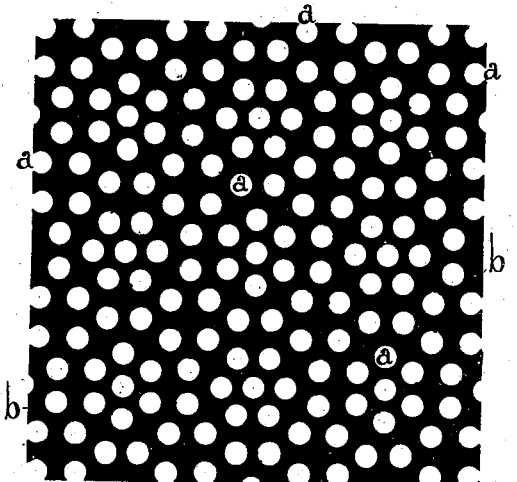
Figure 2:
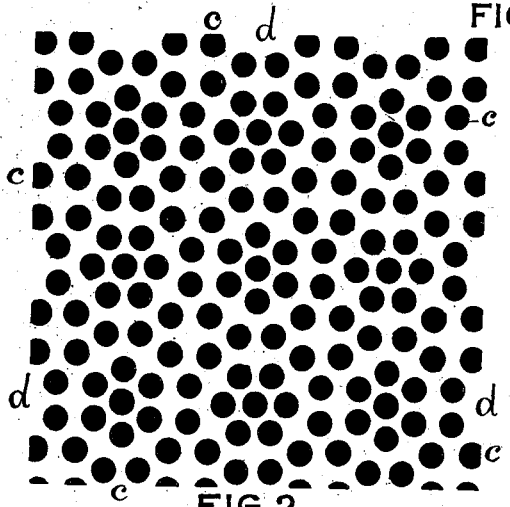
Figure 3:
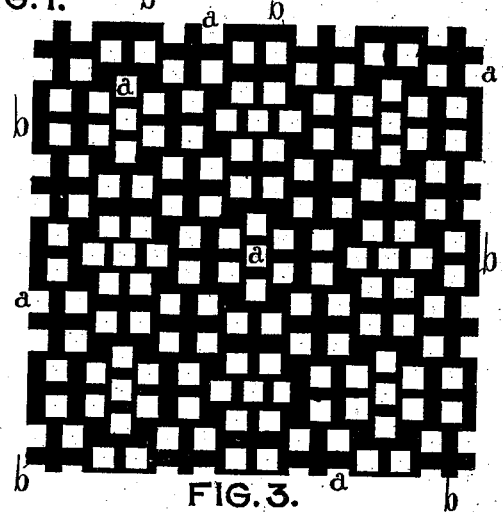
Figure 4:
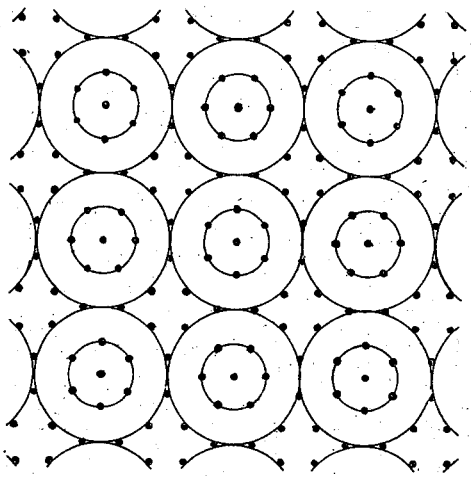
Figure 5:
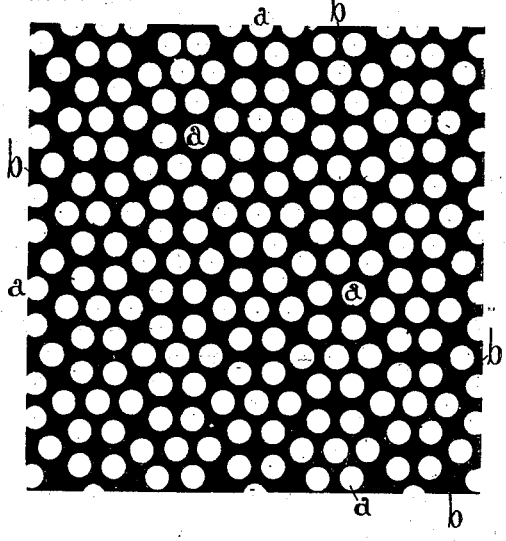
Figure 7:
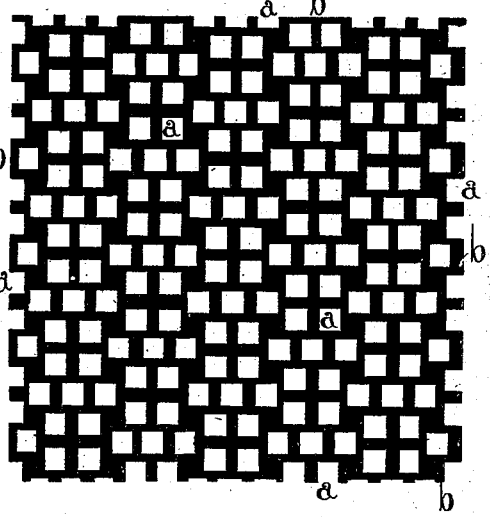
Figure 6:
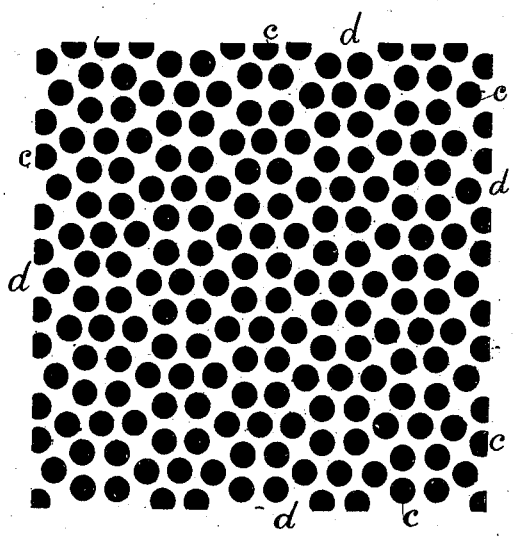
Figure 8:
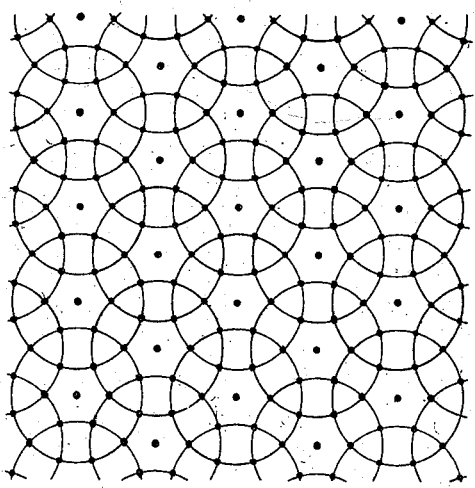
Figure 9:
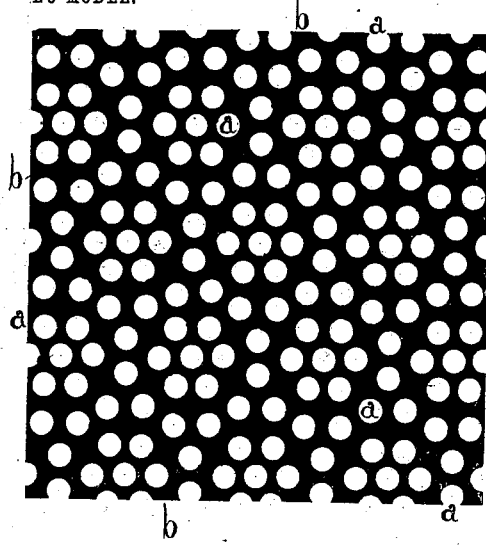
Figure 11:
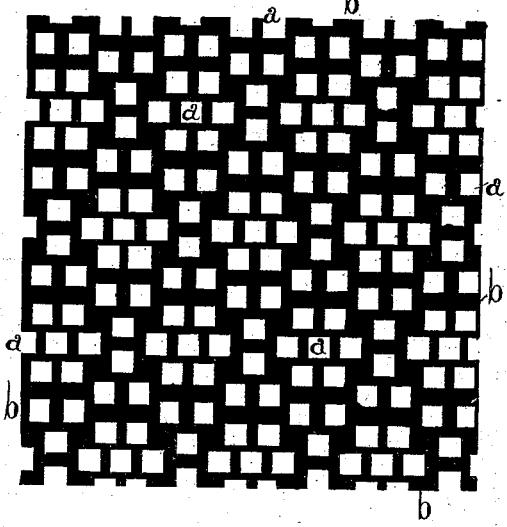
Figure 10:
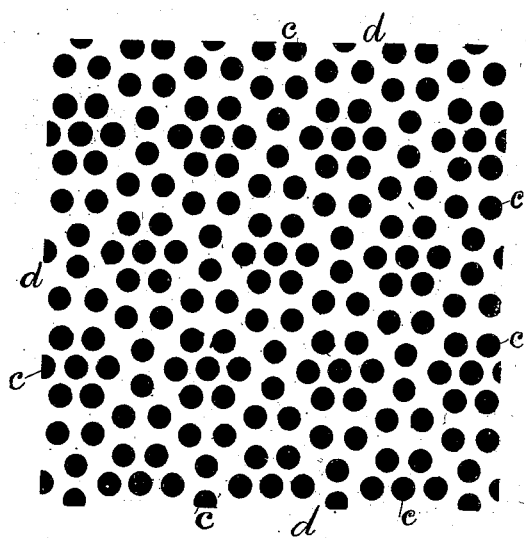
Figure 12:
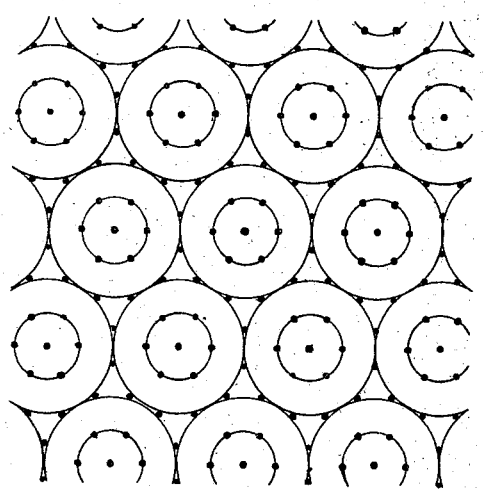

Figure 1 is an enlarged view showing screen or grating of transparent dots on an opaque ground in one arrangement of concentric circles; Fig. 2, an enlarged view showing opaque dots on a transparent ground in similar arrangement of concentric circles; Fig. 3, a similar view to Fig. 1, showing angular transparent dots; Fig. 4, a diagram showing arrangement of concentric circles passing through the centers of the dots shown in Figs. 1, 2, and 3; Fig. 5, an enlarged view showing screen or grating of transparent dots on an opaque ground in another arrangement of concentric circles; Fig. 6, an enlarged view showing opaque dots on a transparent ground in similar arrangement of concentric circles; Fig. 7, a similar view to Fig. 5, showing angular transparent dots; Fig. 8, a diagram showing arrangement of concentric circles passing through the centers of the dots or spaces shown in Figs. 5, 6, and 7; Fig. 9, an enlarged view showing screen or grating of transparent dots on an opaque ground in another arrangement of concentric circles; Fig. 10, an enlarged view showing opaque dots on a transparent ground in similar arrangement of concentric circles; Fig. 11, a similar view to Fig. 9, showing angular transparent dots; Fig. 12, a diagram showing arrangement of concentric circles passing through the centers of the dots shown in Figs. 9, 10, and 11.

In carrying out the invention the screens or gratings may be produced photographically or by other means.

The transparent dots $a$ (shown in Figs. 1, 3, 5, 7, 9, and 11 on an opaque ground $b$) are arranged in every case in concentric circles around a central dot or opening, as shown in the diagrams, Figs. 4, 8, and 12, or in any other arrangement of concentric circles. The transparent dots $a$ may be round, as in Figs. 1, 5, and 9, or square, as in Figs. 3, 7, and 11, or of any other suitable or convenient shape, but preferably round, in order to produce a round dot upon the resulting negative. The screens may also be produced with black opaque dots $c$ on a transparent ground $d$, as shown in Figs. 2, 6, and 10, also arranged in concentric circles around a central dot, as shown by the diagrams, Figs. 4, 8, and 12. The arrangements shown in Figs. 2, 6, and 10 are the reverse of the arrangements shown in Figs. 1, 5, and 9. The opaque dots $c$ may be of any shape.

In carrying out my invention I paint or print a sheet of material, such as paper, with a covering of dense black dots (round, square, or other form) in concentric circles around a central one. I then photograph this sheet of paper to any desired scale, and the resulting negative, when finished and protected with a glass cover, forms the glass screen of the design, as shown in Figs. 1, 3, 5, 7, 9, or 11 for producing half-tone negatives.

To produce screens with black dots on a transparent ground, I make a print onto a collodion or other sensitive plate from the above-described screen, which after development and intensification is provided with a protecting glass cover, and this plate forms the glass screen, as shown in Figs. 2, 6, and 10, or I may produce them by photographing a sheet of paper prepared with white spots on a black ground. Also the said screens may be printed onto glass plates prepared with a sensitized surface of bichromated albumen, gelatin, asphalt, or other sensitive preparation developed, inked up, strengthened with asphalt, and then etched. After clearing off the plate it is rubbed in with a black color, the surplus color is cleaned off, it is provided with a protecting glass cover, and then forms an etched screen, as shown in the figures.

The object and advantage of the arrangement of the dots in concentric circles, as shown in the drawings, are to prevent the formation of continuous or unbroken runs on lines of dots in the screen or grating and of the dots in the resulting negative either vertically, horizontally, diagonally, or at any angle such as necessarily results in negatives produced by means of the ordinary cross-line or chess-board screens now used for the half-tone-engraving process.

A great advantage in the use of screens with the dots arranged in concentric circles around a central one as described and invented by me is that by their use the objectionable screeny-line effect of half-tone engravings produced by cross-line or chess-board screens is avoided, and an effect of a mechanical mixed engraving stipple or pin without any unbroken runs or lines of dots or pins is produced in its place. A further advantage in the use of my screens consists in the great facility they offer in producing perfect half-tone negatives, which when made with my improved screen are produced in a series of dots of absolute opacity, varying in size from the finest pin-point and joining up with a fine clear point or pin-hole in the high lights, according to the graduation of the subject photographed and projected through the lens, thus rendering the printing on the metal and ultimate etching process much easier.

What I claim as my invention, and desire to protect by Letters Patent, is—

1. A half-tone photographic screen consisting of a plate having a number of dots formed upon its face placed out of line with the adjacent ones on both sides, to present non-continuous runs of dots in every direction substantially as described.

2. A half-tone photographic screen, consisting of a plate having dots formed thereon in concentric circles, and out of line with the adjacent ones on each side, to present non-continuous runs of dots upon the screen, in any direction substantially as described.

3. A half-tone photographic screen, comprising an opaque plate having dots formed thereon, placed in concentric circles around a central opening, and out of line with adjacent ones on either side, whereby a screen is produced without a continuous run of openings in any direction substantially as described.

In witness whereof I have hereunto signed my name in the presence of two subscribing witnesses.

HENRY LYON.

Witnesses:
J. OWDEN O'BRIEN,
B. NATHAN WOODHEAD.